United States Patent [19]
Sargent

[11] 3,785,694
[45] Jan. 15, 1974

[54] FLEXIBLE COVER ASSEMBLY

[75] Inventor: Robert J. Sargent, St. Paul, Minn.

[73] Assignee: Retsel Inc., Pension Fund, St. Paul, Minn.

[22] Filed: Dec. 13, 1971

[21] Appl. No.: 207,202

[52] U.S. Cl. .................................................. 296/98
[51] Int. Cl. ............................................. B60j 11/00
[58] Field of Search ........................... 296/98, 100; 248/308, 289, 290; 211/96

[56] References Cited
UNITED STATES PATENTS
2,976,082  3/1961  Dahlman ............................. 296/98
2,936,148  5/1960  Gralewicz .......................... 248/308
3,384,413  5/1968  Sargent .............................. 296/98

Primary Examiner—Robert R. Song
Attorney—Alan G. Carlson et al.

[57] ABSTRACT

A flexible cover assembly is disclosed for use with an open-topped semi-trailer. The assembly includes means for rolling the flexible cover into a generally cylindrical roll over the top of the semi-trailer to a position adjacent one side thereof and means for storing the flexible cover in the rolled position with the flexible cover extending past the side of the trailer thus allowing the bows extending transversely across the semi-trailer to be removed providing a loading area through the open top of the semi-trailer.

2 Claims, 11 Drawing Figures

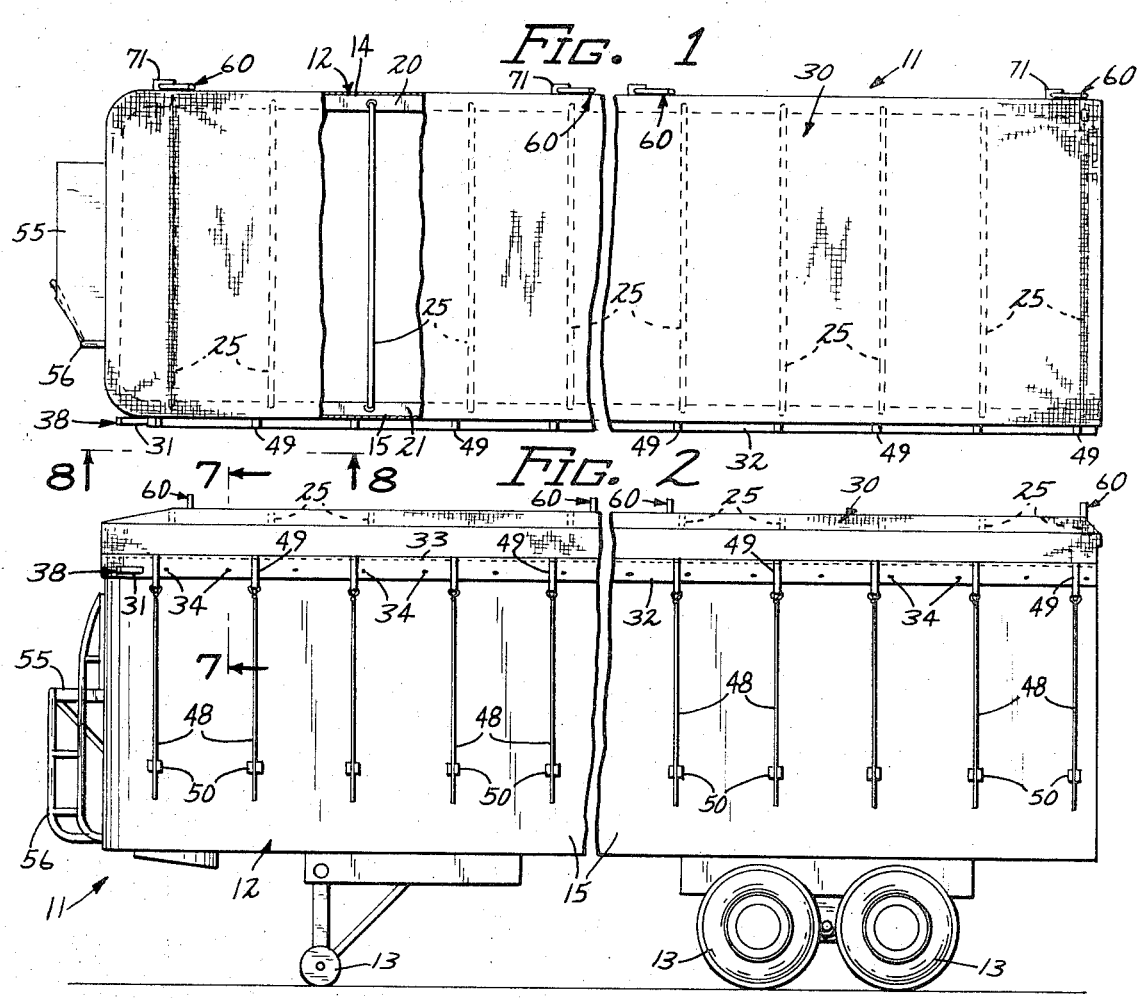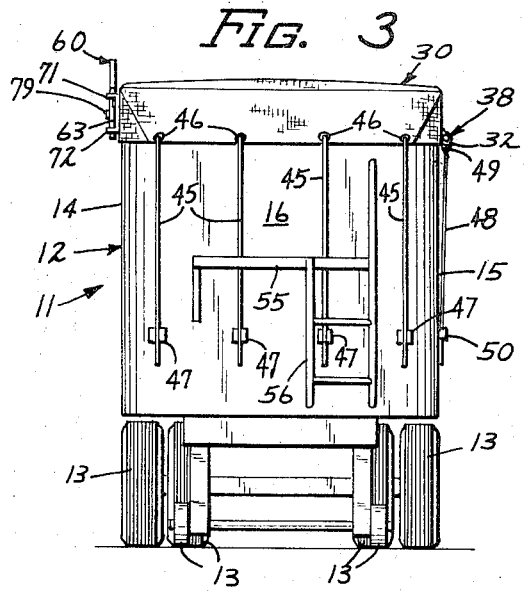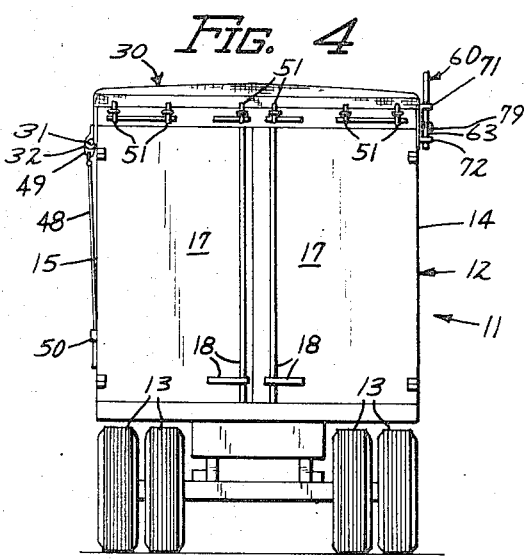

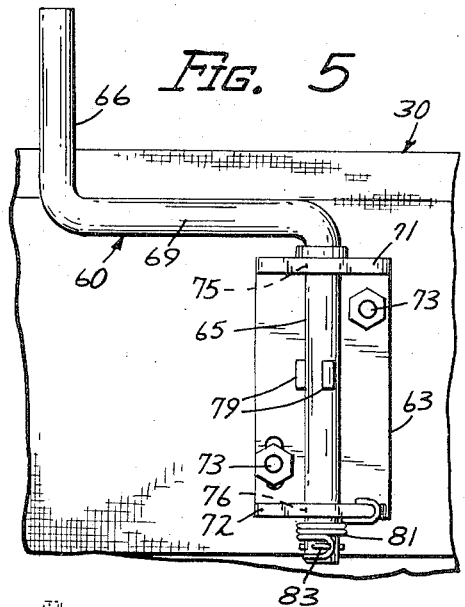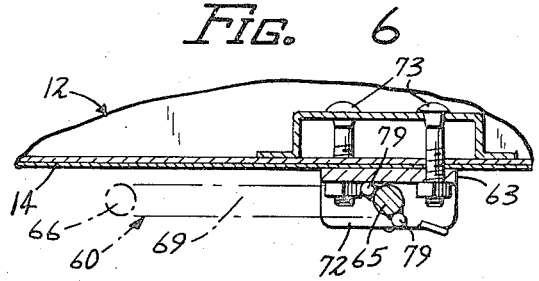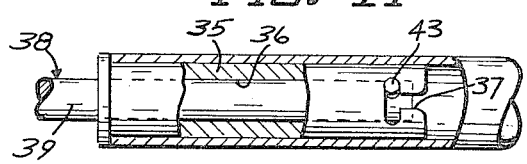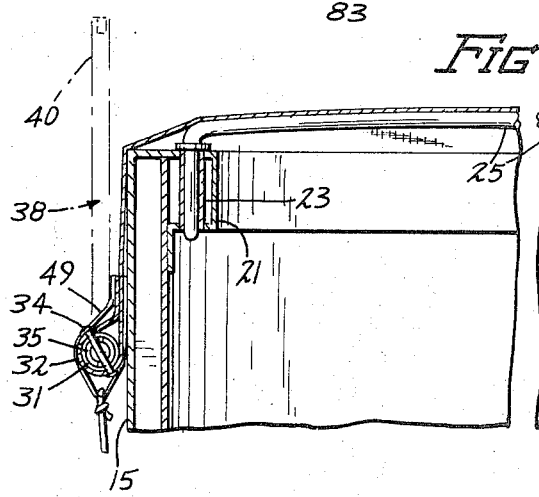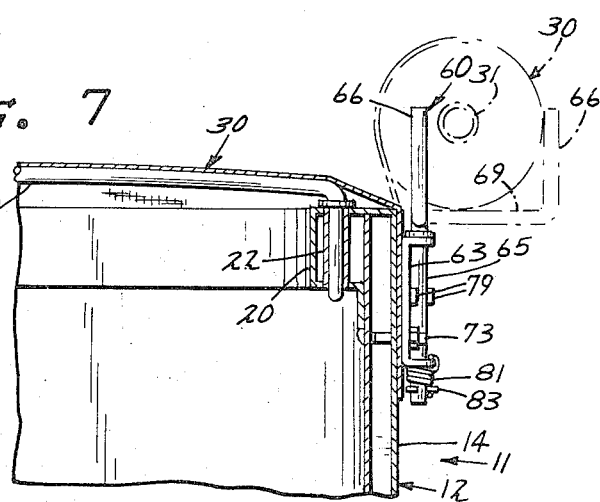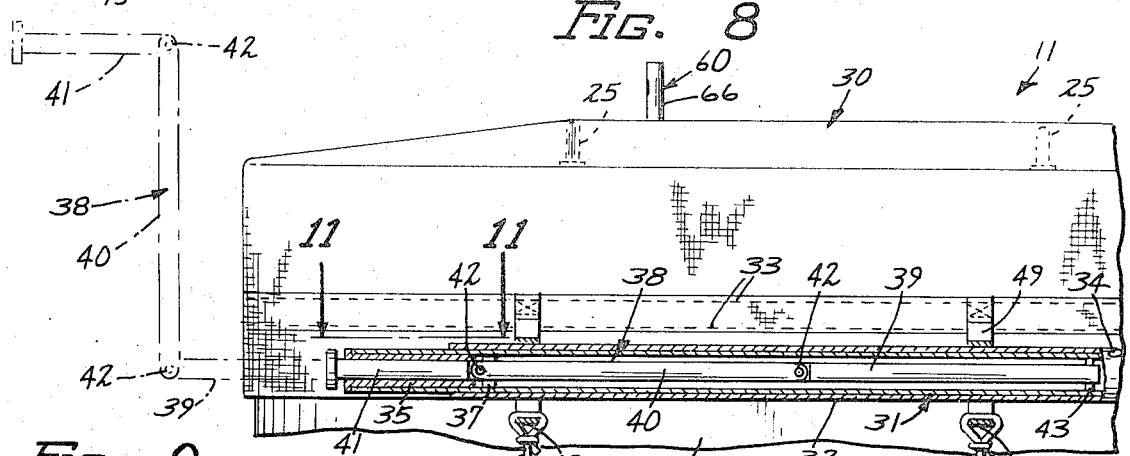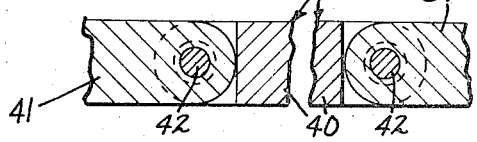

FLEXIBLE COVER ASSEMBLY

BACKGROUND OF THE INVENTION

1. Field of the Invention

This invention pertains to a new and improved flexible cover assembly for semi-trailers and the like, and more particularly to apparatus for covering an open-topped semi-trailer which may be conveniently handled by one man, and which can be stored at the top side of the trailer without hampering the loading and unloading operation of the trailer.

In the trucking industry, open-topped semi-trailers are utilized to transport bulk loads and excessively large equipment which may be loaded from the top by means of a crane or the like. To load and unload this type of material, the top must be removable and a flexible cover, such as a canvas or the like, is generally utilized for this purpose. Removable steel bows are engaged in spaced apart openings in the top of the side walls to aid in maintaining the side walls vertical and to help maintain the flexible cover in position over the semi-trailer.

In the industry the top of the semi-trailer is covered by a generally rectangular-shaped canvas or the like, the edges of which are fastened to the outer surfaces of the upright walls of the semi-trailer, which will be referred to as the cargo box in this specification. In general, the type of semi-trailer discussed in this specification is the type having a cargo box with the maximum outside dimensions allowed by local, state and federal laws. Because of the size of the cargo box it is extremely difficult for a single man to stretch a flexible cover over the top thereof and fasten the cover by the edges to the cargo box.

2. Description of the Prior Art

Some devices have been patented wherein a canvas can be slid longitudinally the length of the cargo box and stored in an accordion-like position at the front thereof, or stretched the length of the box to serve as a cover. These devices are not satisfactory because it still requires a great amount of effort for a single man to slide the flexible cover longitudinally the length of the cargo box. Also, in many instances these devices do not adequately cover the cargo box. Some devices have been patented wherein a flexible cover is rolled transversely the width of the cargo box and stored in a rolled position against the outer surface of one of the side walls. These devices are unsatisfactory because they employ permanent storage means for the rolled cover which increases the width of the cargo box and, therefore, is illegal when the cargo box already has the maximum allowable outer dimensions. My U.S. Pat. No. 3,384,413 solved these problems and the present invention offers even greater advantages.

SUMMARY OF THE INVENTION

In the present invention a generally rectangular flexible cover is fixedly attached along one longitudinal edge to the outer surface of one vertical side wall of the cargo box. The opposite edge has a cylinder attached thereto for rolling the flexible cover therearound in a transverse direction. A crank is engageable in one end of the cylinder so that a single man can rotate the cylinder from one end, and roll it from one edge of the cargo box to the other thereby forming the flexible cover into a roll. The crank can be stored within the cylinder when not in use. The rolled flexible cover is stored at the side of the cargo box by a cover storage apparatus. When the rolled flexible cover is in this position, the bows connecting the vertical side walls of the cargo box can be removed thus providing an area for loading and unloading the cargo box. The cover storage apparatus when not in use rides flush against the side of the cargo box. Because the cover storage apparatus is able to assume a position flush against the cargo box side it does not appreciably increase the outer dimensions of the cargo box and, therefore, the present invention can be utilized on cargo boxes having nearly the maximum allowable outer dimensions.

It is an object of this invention to provide a new and improved flexible cover assembly for an open-topped semi-trailer.

It is a further object of this invention to provide a flexible cover assembly for an open-topped semi-trailer which may be utilized on cargo boxes having nearly the maximum allowable outer dimensions.

It is a further object of this invention to provide a flexible cover assembly which may be rolled into a storage position allowing bows which extend between vertical side walls of the cargo box to be removed.

It is still a further object of this invention to provide a flexible cover assembly for an open-topped semi-trailer which may be rolled into the storage position or unrolled and fastened over the cargo box by a single operator.

It is still a further object of this invention to provide a flexible cover assembly having a crank which when not in use can be stored within the cylinder about which the flexible cover is stored.

These and other objects of this invention will become apparent to those skilled in the art upon consideration of the accompanying specification, claims and drawings.

BRIEF DESCRIPTION OF THE DRAWINGS

Referring to the drawings:

FIG. 1 is a view in top plan of a semi-trailer having the present invention attached to and fastened in the unrolled position, some parts broken away;

FIG. 2 is a view in side elevation of the apparatus illustrated in FIG. 1, some parts broken away;

FIG. 3 is a view in end elevation as seen from the front of the semi-trailer illustrated in FIG. 1;

FIG. 4 is a view in end elevation as seen from the rear of the semi-trailer illustrated in FIG. 1;

FIG. 5 is an enlarged detail view of the cover storage means and the means for mounting same onto the side walls of the semi-trailer illustrated in FIG. 1;

FIG. 6 is an enlarged detail view in top plan of the cover storage means and mounting means of FIG. 5;

FIG. 7 is an enlarged sectional view as seen from the line 7—7 in FIG. 2;

FIG. 8 is an enlarged detail view as seen from the line 8—8 in FIG. 1;

FIG. 9 is an enlarged detail view, with a portion broken away, of the cranking means of the present invention;

FIG. 10 is an enlarged detail view illustrating the attachment of sections of the cranking means; and FIG. 11 is an enlarged sectional view as seen from the line 11—11 in FIG. 8.

DESCRIPTION OF THE PREFERRED EMBODIMENT

Referring first to FIGS. 1 through 4, the numeral 11 generally designates a semi-trailer including a cargo box 12 with wheels 13 attached thereunder for transporting the semi-trailer on highways and for supporting the trailer when not in transport. The cargo box 12 has a vertical curb side wall 14, a street side wall 15, and a front wall 16. The rear of the cargo box 12 is enclosed by a pair of doors 17 hingedly attached to the curb side wall 14 and the street side wall 15. The pair of doors 17 are cooperatively closed together in the usual manner by the handle and bar arrangement 18. An inwardly extending lip 20 is formed adjacent the upper edge of curb side wall 14, and an inwardly extending lip 21 is formed adjacent the upper edge of the street side wall 15. The lips 20 and 21 are formed as a part of the cargo box 12 and have a plurality of longitudinally spaced apart vertical openings having vertical sleeves 22 and 23, respectively, therein. A plurality of bows 25 are adapted to extend transversely across the cargo box 12, and each bow 25 has one end adapted to be engaged in a sleeve 23 in a lip 21 while the opposite end is adapted to be engaged in the sleeve 22 in a lip 20. The bows 25 are parallel and longitudinally spaced apart the length of the cargo box 12 to maintain the curb side wall 14 and the street side wall 15 approximately parallel even though a bulk load is being carried therein. Bows 25 can be constructed of a single piece of metal of a predetermined length if it is desired or a turnbuckle may be provided in order that the length may be varied.

A generally rectangular flexible cover 30 is fixedly attached adjacent one edge to the upper surface of the curb side wall 14. The cover 30 is held fixedly in place by some convenient means such as bolts (not shown) and by the cover storage apparatus to be described. The flexible cover 30 is formed so that it covers the entire top of the cargo box 12 and overlies substantial portions of the street side wall 15 and the front wall 16.

Referring now additionally to FIGS. 7 and 8, an elongated cylinder 31 is placed adjacent the edge of the flexible cover 30 overlying the outer surface of the street side wall 15, and the flexible cover 30 is folded over the cylinder 31 to form a loop of material 32 therearound. Cylinder 31 extends from adjacent the front wall 16 of the cargo box 12 to within a short distance of the rear of the cargo box 12. The loop of material 32 surrounding the cylinder 31 is closed by sewing or the like at 33. The cylinder 31, which may be formed from any suitable material, is constructed from a hollow aluminum tube in the present embodiment to obtain a desired weight and strength. A plurality of bolts or elongated rivets 34 fixedly attach the cylinder 31 within the loop of the flexible material 30 to prevent relative rotation therebetween.

Referring now additionally to FIGS. 9, 10 and 11, the front end of the cylinder 31 has a sleeve 35 fixedly attached therein, having an axial base 36 which is of a smaller diameter than the diameter of the elongated cylinder 31. Formed in the wall of sleeve 35 at the inner end thereof is a slot 37 which is in the form of a T.

A crank, generally designated 38, is constructed with three portions 39, 40 and 41 attached to each other by means of pins 42. Crank portions 39, 40 and 41 can be rotated to positions perpendicular with respect to each other in order to form a crank as shown in broken line in FIG. 8 or the portions can be made parallel with respect to each other in order that they may be insertable within elongated cylinder 31 for storage as shown in solid line in FIG. 8. Shown in FIG. 11 is a boss 43 which is located on portion 39 of crank 38 in order that when boss 43 is located in T-slot 37 the rotation of crank 38 will rotate the entire cylinder 31 thereby rolling the flexible cover 30 therearound. Since the flexible cover 30 is fixedly attached to the upper surface of the curb side wall 14, as the cylinder 31 is rotated by crank 38 it moves up the outer surface of the street side wall 15 and across the top of the cargo box 12 to the upper edge of the curb side wall 14.

A plurality of short sections of rope 45 are fixed in grommets 46 adjacent the front edge of the flexible cover 30 and means 47 are provided in which the loose ends of the ropes 45 may be engaged to maintain the flexible cover 30 tautly in place over the cargo box 12. A second plurality of short lengths of rope 48 are fixedly attached to the flexible cover 30 in spaced apart relation along the street side wall 15. The ropes 48 are attached to the flexible cover 30 by means of straps 49 which encircle the cylinder 35 and the loop of flexible material 32 surrounding the cylinder 31 and are sewed at 33. The straps 49 may be constructed from any suitable material such as leather, canvas, or the like. Means 50, similar to the means 47, are provided along the outer surface of the street side wall 15 to engage the free ends of each of the ropes 48 and maintain the flexible cover 30 tautly in position over the cargo box 12. A plurality of short flexible straps 51 are attached in spaced apart relation along the rear edge of the flexible cover 30 and adapted to engage a buckle attached adjacent to the rear upper edge of the cargo box 12 above the doors 17 to maintain the rear edge of the flexible cover 30 tautly in position without interfering in the operation of the doors 17. The cylinder 31 is somewhat shorter that the cargo box 12 so that it does not interfere with the doors 17 being fully open.

A small platform 55 having a ladder 56 depending therefrom is fixedly attached to the outer surface of the front wall 16 so that an operator can easily climb into the platform 55 and manipulate the crank 38 to roll the flexible cover 30 over the top of the cargo box 12. A single operator can move the flexible cover 30 into the rolled position or out of the rolled position very quickly and simply by rotating the crank 38 at the end of the cylinder 31. The operator has simply to engage the ropes 45 and 48 and the means 47 and 50 and buckle the straps 51 to secure the flexible top 30 after the unrolling thereof, or disengage the ropes 45 and 48 and the straps 51 prior to rolling the flexible cover 30 into the rolled position.

During loading or unloading of the cargo box 12, it is necessary to move the flexible cover 30 into the rolled position, illustrated in dotted lines in FIG. 7, and remove the bows 25 from the sleeves 22 and 23 in the lips 20 and 21. In the present invention in order to move the rolled cover 30 from over the lip 20 so that the bow 25 can be removed from sleeve 22 a cover storage means, designated 60, is provided.

Referring to FIGS. 5, 6 and 7, the cover storage means 60 comprises an elongated crank-shaped bar and is shown in juxtaposition with the curb side wall 14. Crank-shaped bar 60 is mounted by a mounting plate 63 and has a first portion 65 which is parallel to a second portion 67. Portions 65 and 67 are separated from each other by a third portion 69, which third portion is perpendicular to the first portion 65 and the second portion 67. Plate 63 has outwardly extending spaced, horizontal flanges 71 and 72 and is attachable to cover 30 and side wall 14 by means of bolts 73 insertable through holes in plate 63 and in cover 30 and side wall 14. The holes in plate 63 may be slotted in order to provide for adjustment of plate 63 with respect to side wall 14. The upper flange 71 has a hole 75 located therein and the lower flange 72 has a hole 77 located therein. The first portion 65 is receivable within holes 75 and 77 for rotation about the longitudinal axis of portion 65. Two bosses 79 are provided on portion 65 in order to limit the rotation of portion 65 as they make contact with plate 63. A biasing spring 81 is secured to bottom flange 72 and to a boss 83 on portion 65 in order to bias the elongated bar 60 in juxtaposition with side wall 14. When in this position, portion 69 is in juxtaposition with side wall 14. Thus, when the unrolled cover 30 is secured to side wall 15 the cover storage means 60 is biased in a position flush against the side wall 14 but when the rolled cover 30 is rolled outwardly of side wall 14 the cover 30 begins to push outwardly on portion 67 and to rest upon portion 69. The force of rolled cover 30 will thus move portion 69 into a position approximately perpendicular to side wall 14, shown in broken line in FIG. 7, in order that the rolled cover may be stored in a position outwardly of side wall 14. When the cover is in this position the bows 25 may be removed from sleeves 22 and 23 for the loading or materials through the top area of the cargo box 12.

While I have shown and described a specific embodiment of this invention, further modifications and improvements will occur to those skilled in the art. I desire it to be understood, therefore, that this invention is not limited to the particular form shown and I intend in the appended claims to cover all modifications which do not depart from the spirit and scope of this invention.

What is claimed is:

1. A flexible cover assembly for an open-topped semi-trailer having a first side wall and a second side wall, comprising:
  a. a generally rectangular flexible cover having one edge fixedly attached along said first side wall of said semi-trailer and adapted to overlie the open top thereof;
  b. an elongated cylinder fixedly attached to said flexible cover adjacent an edge thereof opposite and parallel to said edge attached to said semi-trailer;
  c. cranking means attached to one end of said elongated cylinder for manually rolling and unrolling said flexible cover around said elongated cylinder;
  d. cover storage means for storing said rolled cover exterior of said first wall of said semi-trailer comprising a crank-shaped bar formed into a first and a second parallel part separated by a third part perpendicular to each of said parallel parts; and,
  e. means mounting said cover storage means at the side of said semi-trailer having said flexible cover attached thereto for biasing said cover storage means in juxtaposition with said semi-trailer side when said cover storage means is not storing said cover and allowing movement to a position outwardly of said semi-trailer side when said cover storage means is storing said rolled cover comprising:
    1. a plate attached parallel with said semi-trailer side;
    2. a first and a second flange attached to said plate and extending perpendicularly to said plate, each of said flanges having a hole therethrough for receiving said bar first parallel part for rotation about an axis of said bar first part, and
    3. means biasing said bar such that said first, second, and third parts are normally parallel with, and in juxtaposition to, said semi-trailer side while allowing said bar first parallel part to rotate thus moving said bar third part to a position approximately perpendicular to said semi-trailer side of the storage of said rolled cover between said bar third part and said bar second part.

2. The apparatus of claim 4 wherein:
  a. said elongated cylinder has a sleeve fixedly attached therein, said sleeve having an axial bore and including a slot; and
  b. said cranking means includes,
    1. a first elongated member insertable within said axial bore of said sleeve and having a boss thereon insertable within said slot,
    2. a second elongated member attached to said first elongated member and mounted thereto for positioning in a first position perpendicular to said first elongated member and for positioning in a second position parallel with said first elongated member, and
    3. a third elongated member attached to said second elongated member and mounted thereto for positioning in a first position perpendicular to said second elongated member and for positioning in a second position parallel with said second elongated member,
  c. whereby, when said first, second, and third elongated members are positioned parallel with respect to each other they are insertable within said sleeve axial bore for storage, and when said third elongatd member is in said second position and said boss is inserted within said slot, said third elongated member is rotatable parallel with respect to said first elongated member and said elongated cylinder causing the rotation of said elongated cylinder for manually rolling and unrolling said flexible cover around said elongated cylinder.

* * * * *

UNITED STATES PATENT OFFICE
CERTIFICATE OF CORRECTION

Patent No. 3,785,694     Dated January 15, 1974

Inventor(X) Robert J. Sargent

It is certified that error appears in the above-identified patent and that said Letters Patent are hereby corrected as shown below:

Column 6, line 27, "claim 4" should be --claim 1--.

Signed and sealed this 16th day of April 1974.

(SEAL)
Attest:

EDWARD M. FLETCHER, JR.          C. MARSHALL DANN
Attesting Officer                Commissioner of Patents